June 30, 1964     J. M. SISKO     3,139,371
CORE BLOCK CONSTRUCTION
Filed May 24, 1963
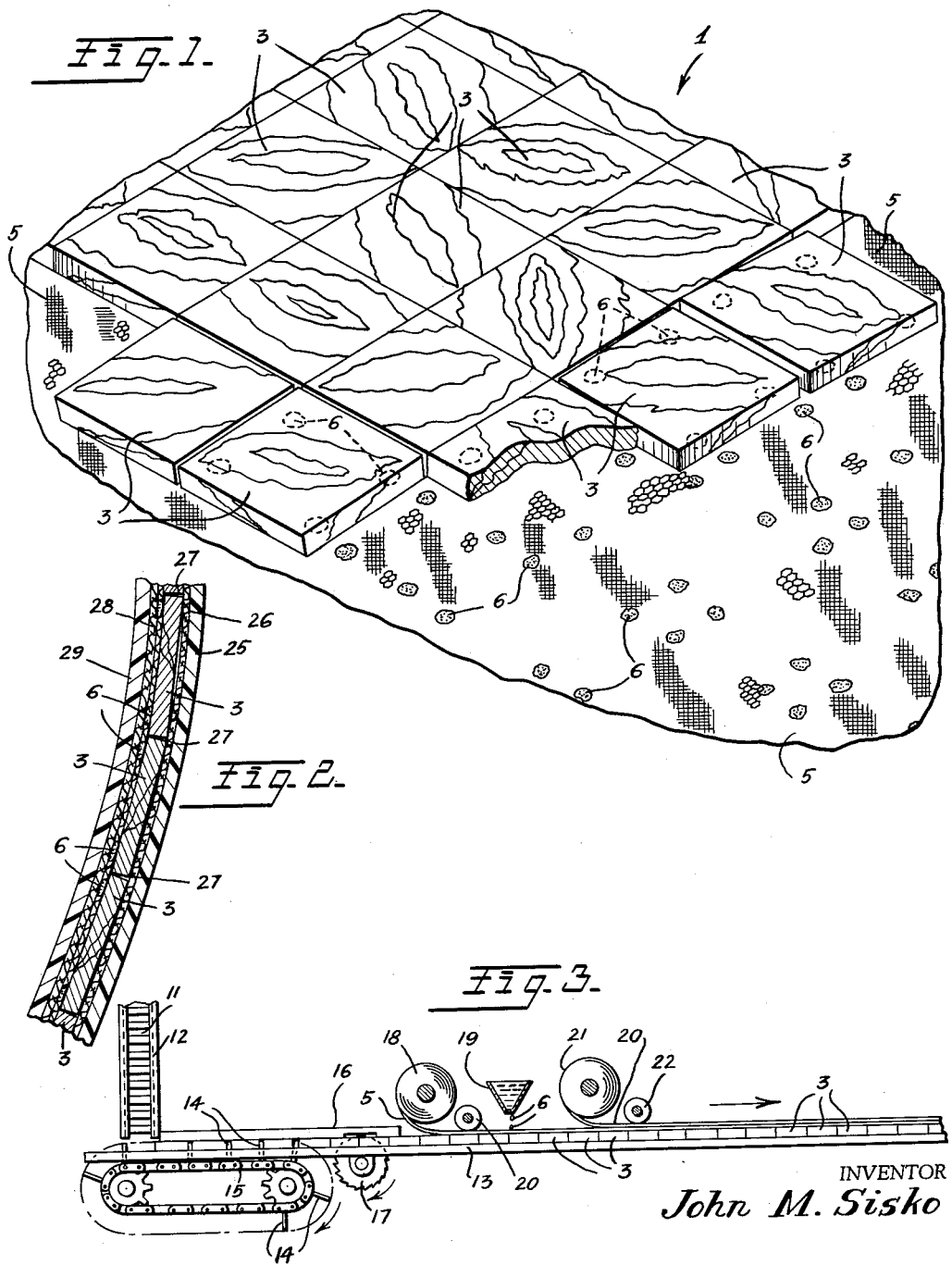
INVENTOR
John M. Sisko
BY
Bacon & Thomas
ATTORNEYS

United States Patent Office 3,139,371
Patented June 30, 1964

3,139,371
CORE BLOCK CONSTRUCTION
John M. Sisko, 6463 Manor Lane, South Miami, Fla.
Filed May 24, 1963, Ser. No. 283,086
6 Claims. (Cl. 161—37)

This invention relates generally to a novel construction material comprising a plurality of core blocks arranged in sheet form, and to laminates incorporating this novel material.

It is a primary object of the present invention to provide a flexible light-weight, dimensionally stable construction material, which can readily be incorporated into a flat laminate or one of, single or compound curvature.

Another important object of the invention is to provide a construction material utilizing inexpensive materials which can be economically assembled and incorporated into the desired laminate.

Another object is to provide a construction material which is strong and durable in use and one which has a high resistance to deterioration by exposure to moisture, weather, or other adverse conditions.

A more specific object of the invention is to provide a laminate of the desired characteristics wherein the novel core material can be conveniently and economically assembled together with one or more rigid sheets of material on either side thereof.

A further object is to provide a light-weight weatherproof laminate capable of a high degree of sound absorption and vibration absorption, and one that is particularly well qualified for use in constructing boat hulls and the like.

Still another important object is to provide a plastic sandwich laminate which is capable of being formed with a compound curvature without loss of dimensional stability or other desirable characteristics.

Other objects and advantages will be apparent from the following description when considered in connection with the accompanying drawings, in which:

FIG. 1 is a fragmentary perspective view illustrating the novel core block construction material of the present invention, portions thereof being removed to illustrate the details of construction;

FIG. 2 is a fragmentary sectional view illustrating the core material of FIG. 1 incorporated in position in the novel laminate of the present invention; and FIG. 3 is a somewhat diagrammatic view illustrating the steps involved in producing the novel construction material in accordance with the invention.

Referring now more specifically to the drawings, the novel core material of the present invention is depicted fragmentarily in FIGURE 1 and is generally indicated by the numeral 1. It comprises a plurality of block members 3 assembled in end-to-end and side-to-side abutment to form a continuous sheet. Block members 3 are preferably formed of balsa wood or the like, although it will be readily appreciated that many other materials might be employed. For example, certain types of styrofoam and other plastics may be employed, depending upon the conditions under which the finished product is to be used.

The dimensions of the blocks 3 may vary in accordance with the intended use of the finished product. However, in most circumstances the blocks should not be larger than three inches square and they would normally have a height of between one-half inch and one inch. The balsa employed is not normally visible in the final product and, accordingly, balsa of the highest quality need not be employed.

A flexible mesh 5 or the like is disposed across one surface of the assembled blocks 3 and adhered thereto by spot gluing with a polyester resin adhesive or the like.

A hexagonal nylon mesh capable of stretching in any direction has been found to be preferable and the openings in the mesh should be on the order of one-eighth of an inch to provide for a high degree of stretching and still have a sufficient density of strands so as to avoid defects in the spot adhesion.

The spot gluing should be effected with some care to prevent the resin from entering the cracks between adjacent blocks. In practice, it has been found that the mesh should be adhered to each block at approximately four points, spaced inwardly from the edges of the block to facilitate relative movement of the individual blocks with respect to one another.

The formation of the aforedescribed core material is illustrated schematically in FIG. 3. A plurality of balsa slats 11 are fed in a stack through a magazine 12 onto a supporting surface 13. The lowermost slats are then moved laterally on the supporting surface by means of a plurality of dog elements 14 mounted on driven endless chains 15, only one of which is illustrated in FIG. 3. Any suitable guide means 16 is employed to hold the slats down and prevent them from buckling as they are successively moved forwardly across the supporting surface 13, from the lowermost position in the magazine 12. As the slats move forwardly, they pass through a series of transversely spaced saw blades 17, one of which is shown in FIG. 3, projecting upwardly through the supporting surface. At this point, if the saw blades 17 are spaced a distance equal to the width of the slats 11, the slats are divided into square blocks 3 of the type illustrated in FIG. 1.

A reel 18 of nylon mesh 5 is fed onto the upper surface of the forwardly moving blocks 3 immediately behind the saw blades 17. As the mesh 5 is laid over the blocks 3, drops 6 of glue are applied from a trough 19, in timed relation with respect to the rate of movement of the blocks 3. A layer 20 of wax paper or the like may be applied from a reel 21 to protect the adhesive until it is cured. One or more rollers 20 or other guide means may be employed to hold the mesh 5 in position until the adhesive spots 6 have set. Subsequently, the wax paper 20 is peeled off before the material is used.

The core material 1 may be used in many different types of laminates including those of the type generally referred to as "plastic sandwiches." It is particularly well adapted for use in laminates incorporating one or more sheets of fiberglass material having either a curvilinear configuration or a compound curvature. A sheet 25 of this type is illustrated fragmentarily in section in FIG. 2, and the laminate depicted could represent, for example, a section taken through the prow of a plastic boat hull. In such an embodiment sheet 25 would form an integral outer shell for the entire boat hull. In forming the laminate a lightweight mat 26 of fiberglass in strand or woven form is cut to conform with the configuration of the hull section being laminated. The mat 26 is thoroughly wetted with a polyester resin or the like, and applied against the inner surface of the corresponding portion of the shell. A sheet of core material 1 is also cut, by means of a thin plate or the like to conform with the configuration of the hull section being laminated and is heavily wetted with polyester resin on the exposed surface of the blocks 3. This section of the sheet 1 is then applied inwardly of the matting 26 with the mesh 5 disposed on the opposite side from that which faces the concavity of sheet 25. The individual blocks 3 of this sheet are then carefully rolled or otherwise pressed toward the shell so that the core material fits tightly thereagainst. As this occurs it will be noted that the stretching characteristics of the mesh 5, and the spot adhesion of blocks 3 thereto, enables each of the core blocks to "float" into the tightest possible engagement with respect to the opposed surface of the shell 25. Accordingly, without the loss of dimensional stability the sheet 1 conforms snugly with the configuration of the inner surface of the shell.

As the sheet 1 is forced into position, excess resin 27 is forced out into the spaces between the blocks 3. A heavier mat 28 of resin-wetted woven roving is then applied inwardly of the sheet 1 and becomes a securely bonded part of the lamination, the blocks 3 being at this point substantially encased in resin. The resin impregnated mat 28 may serve to provide the interior surface of the boat hull section, or, alternatively, a sheet 29 of fiberglass may be applied thereto as indicated in dotted lines in FIG. 2.

In the formation of a boat hull as described hereinabove, it will be readily understood that the laminate may be built up in sections on different portions of the fiberglass shell. For example, one-half of the bottom section of the shell may be first built up with successive layers of the lamination, prior to building up the lamination on the adjacent side, on the opposite half of the bottom, on the other side and on the rear, all in turn.

The boat hull formed in accordance with the principles of the present invention is light-weight and water-proof and has a high buoyancy factor, making it substantially unsinkable. In addition, the hull construction cushions vibrations such as might be caused by an outboard motor and is extremely tough and durable in use.

The hull, however, is but one of the many uses to which the present invention may be put. It is also extremely useful in connection with airplane bodies and other types of constructions.

While one specific embodiment of the invention has been disclosed herein, it should be understood that this disclosure is made by way of illustration rather than limitation. Numerous changes may be made by those skilled in the art, particularly with reference to the dimensions, material and configurations disclosed herein. Changes of this nature would not depart from the spirit of the invention or the scope of the annexed claims.

I claim:

1. A construction material for use in forming laminated boat hulls and the like, comprising: a plurality of core blocks arranged in side-to-side, end-to-end coplanar relation to define a substantially continuous core sheet; a sheet of flexible and stretchable material covering one face only of said core sheet and being provided throughout its entire extent with a plurality of uniformly distributed openings therethrough; and connecting means securing said sheet of flexible material to one face only of said core sheet, said connecting means attaching the sheet of flexible material to the adjacent surface of the individual core blocks at points spaced inwardly with respect to the side edges of said surfaces, the other surfaces of the respective core blocks remaining unconnected thereby to permit a floating movement of said core blocks with respect to said sheet of flexible material and to thereby enable said core sheet to conform against a surface of compound curvature disposed outwardly of said other face thereof.

2. A material as defined in claim 1 wherein said connecting means comprises a spot adhesive.

3. A material as defined in claim 1 wherein said flexible material comprises a lightweight nylon mesh of hexagonal configuration capable of being stretched in any direction.

4. A material as defined in claim 1 wherein said core blocks are formed of balsa, each being on the order of three inches in length and width and on the order of from one-half inch to one inch in depth.

5. A lamination material for boat hulls and the like, comprising an outer shell of rigid material having an inner surface of compound curvature, a plurality of lightweight, dimensionally stable core blocks arranged in side-to-side, end-to-end coplanar relation to define a substantially continuous core sheet disposed inwardly of said outer shell, a sheet of flexible and stretchable material covering one face only of said core sheet and being provided throughout its entire extent with a plurality of uniformly distributed openings therethrough, connecting means securing said sheet of flexible material to one face only of said core sheet, said connecting means attaching the sheet of flexible material to the adjacent surface of the individual core blocks at points spaced inwardly with respect to the side edges of said surfaces, the other surfaces of the respective core blocks remaining unconnected thereby to permit a floating movement of said core blocks with respect to said sheet of flexible material and to thereby enable said core sheet to be conformed to the said inner surface of said outer shell and a resin surrounding said core blocks to embed the same substantially entirely and to hold the same in assembled position against the contour of said outer shell.

6. A lamination as defined in claim 5 wherein a second rigid shell is disposed inwardly of said block members and secured thereto by resin.

References Cited in the file of this patent

UNITED STATES PATENTS

| | | |
|---|---|---|
| 468,355 | Mayhew | Feb. 9, 1892 |
| 1,931,650 | Elmendorf | Oct. 24, 1933 |
| 2,311,044 | Gans | Feb. 16, 1943 |
| 2,432,987 | Garner | Dec. 23, 1947 |
| 2,540,331 | Hlavaty | Feb. 6, 1951 |
| 2,556,071 | Denton | June 5, 1951 |
| 2,556,884 | Muller | June 12, 1951 |
| 2,562,976 | Winnick | Aug. 7, 1951 |
| 2,653,358 | MacDonald | Sept. 29, 1953 |
| 2,735,426 | Claydon | Feb. 21, 1956 |